United States Patent
Caña et al.

(10) Patent No.: US 6,249,552 B1
(45) Date of Patent: Jun. 19, 2001

(54) AUDIO FREQUENCY RECOVERY—DC RESTORER CIRCUIT FOR CORDLESS PHONE APPLICATIONS

(75) Inventors: John-Paul Pizaña Caña; Michael Todd Smiley, both of Calgary (CA)

(73) Assignee: Nortel Networks Limited, Montreal (CA)

( * ) Notice: Subject to any disclaimer, the term of this patent is extended or adjusted under 35 U.S.C. 154(b) by 0 days.

(21) Appl. No.: 09/084,800

(22) Filed: May 26, 1998

Related U.S. Application Data

(60) Provisional application No. 60/060,256, filed on Sep. 29, 1997.

(51) Int. Cl.[7] ................................................ H04L 25/06
(52) U.S. Cl. ................................................................ 375/319
(58) Field of Search ........................... 375/317, 318, 375/319, 326, 372; 330/10, 11, 287, 292, 142, 7, 9, 121, 97, 125; 327/560, 561, 563, 553; 329/314, 318, 319, 320, 321

(56) References Cited

U.S. PATENT DOCUMENTS

| | | | |
|---|---|---|---|
| 5,220,468 | * 6/1993 | Sidman | 360/77.05 |
| 5,350,908 | * 9/1994 | Bechtel | 235/462 |
| 5,467,082 | * 11/1995 | Sanderson | 340/825.54 |
| 5,497,121 | * 3/1996 | D'Hont | 329/302 |
| 5,521,548 | * 5/1996 | Sugawara | 329/306 |
| 5,548,343 | * 8/1996 | Paquier et al. | 348/691 |
| 5,584,062 | * 12/1996 | Meador et al. | 455/260 |
| 5,606,731 | * 2/1997 | Pace et al. | 455/260 |
| 5,737,033 | * 4/1998 | Masuda | 348/678 |
| 5,864,591 | * 1/1999 | Holcombe | 375/345 |
| 6,038,049 | * 3/2000 | Shimizu et al. | 359/189 |
| 6,104,919 | * 8/2000 | Lyall, Jr. et al. | 455/249.1 |
| 6,118,829 | * 9/2000 | North | 375/317 |

\* cited by examiner

*Primary Examiner*—Chi Pham
*Assistant Examiner*—Emmanuel Bayard
(74) *Attorney, Agent, or Firm*—Cobrin & Gittes

(57) ABSTRACT

An audio frequency recovery—DC restorer circuit after demodulation that includes an operational amplifier, a diode, a capacitor and resistor circuitry arranged to supply a reference voltage signal Vref to the operational amplifier. The operational amplifier is also coupled with a demodulated audio frequency baseband signal via the capacitor. The demodulated audio frequency baseband signal is in a filtered condition free of high frequency noise that may otherwise affect quality and having an average voltage Vavg at a level. The operational amplifier clamps the demodulated audio frequency baseband signal above or below the Vref depending upon an orientation of the diode so as to set a new desired Vref and provide as output a clamped baseband signal whose amplitude and waveform is identical to the demodulated audio frequency baseband signal before the clamping except for having a new average voltage (new Vavg) that is at a level different from that of the average voltage of the demodulated audio frequency baseboard signal because of the new desired Vref.

23 Claims, 3 Drawing Sheets

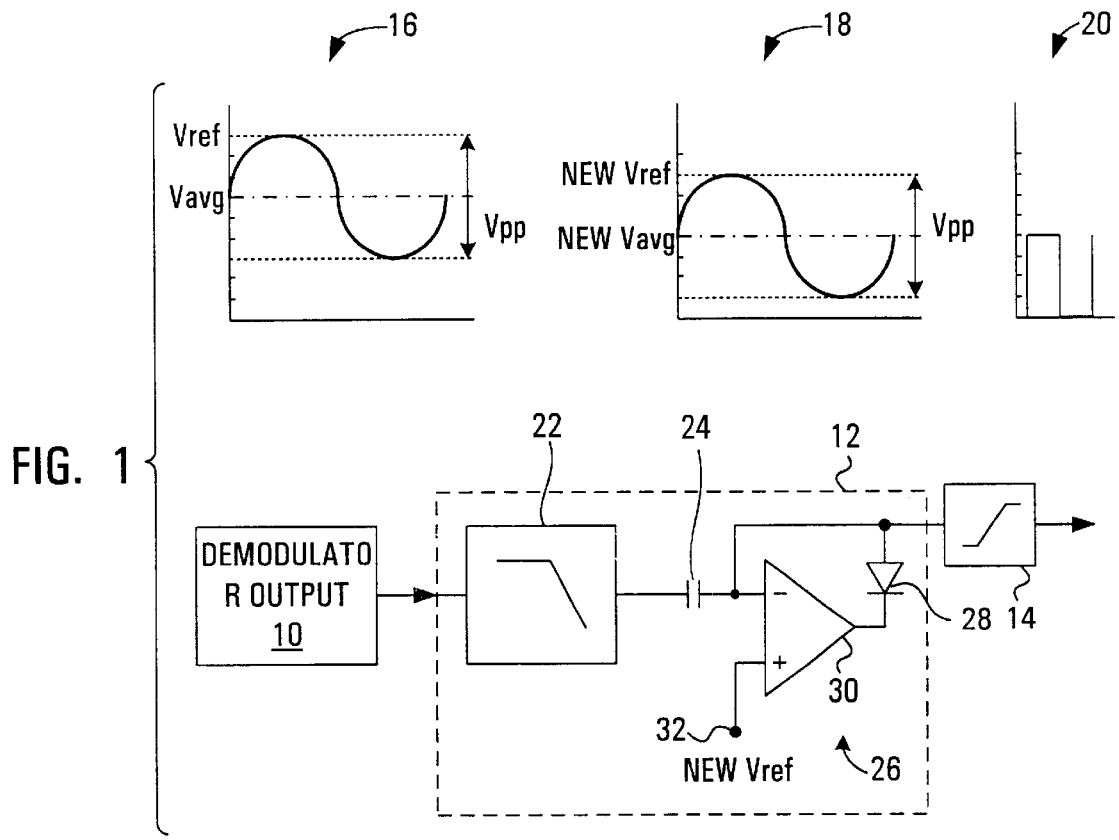
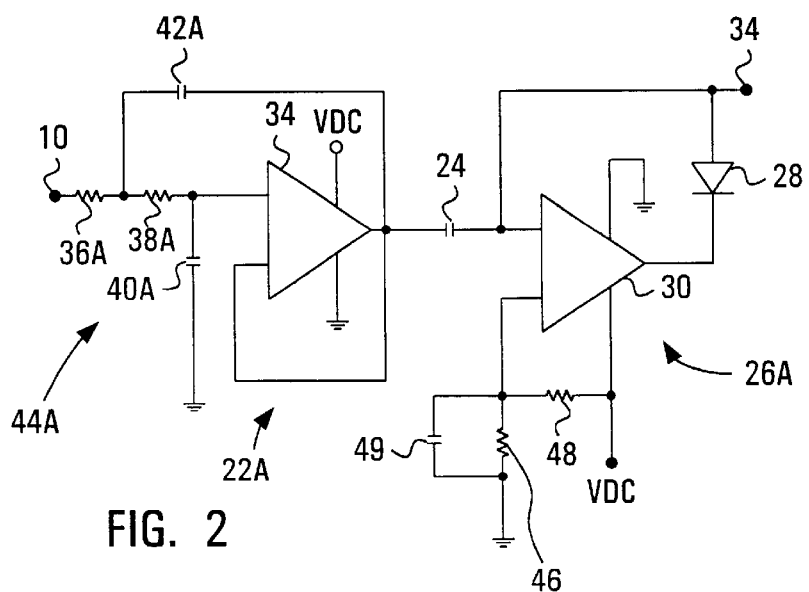
FIG. 1
FIG. 2

AUDIO FREQUENCY RECOVERY— DC RESTORER CIRCUIT FOR CORDLESS PHONE APPLICATIONS

CROSS-REFERENCE TO CO-PENDING PATENT APPLICATIONS

Provisional patent application Ser. No. 60/060,256 Sep. 29, 1997.

BACKGROUND OF THE INVENTION

1. Field of the Invention

The invention relates to an audio frequency recovery-DC restorer circuit after demodulation.

2. Discussion of Related Art

For standard narrowband FM, FSK or PSK of cordless phones after demodulation, a conventional AC coupling capacitor method is used to remove the DC content off of the baseband signal (voice and/or data) before passing the signal to the microprocessor or to the AF amplifier. For a more sophisticated high data rate communication, as exemplified by Time Division Duplex (TDD), the following problems arise if such a conventional approach is employed, which consequently reduces quality performance of the cordless phone.

(a) Sensitivity (b) Distorted demodulated AF signals (c) Less accurate duty cycle of the replicated digital data.

(d) DC offsets due to frequency offsets between the transmitter and the receiver.

(e) DC offsets due to center frequency inaccuracies in a quadrature resonator.

(f) Time Division Duplex (TDD) burst DC ripple that is induced by transient frequency or DC voltage shifts.

The AC coupled circuit basically skews or distorts the demodulated signal. As a consequence, the signal becomes inefficient for use by the receiver systems that require precise baseband quality output. Due to the nature of a capacitor, a transient DC response arises to any time varying shifts in the input DC level. This leads to unstable bit duty cycles and thus increased bit jitter.

Conventional cordless phones employ 49 MHz narrowband and into use multiple stages of filters (passive or active) and transistor combinations. It would be desirable to avoid using such multiple stages of filters.

SUMMARY OF THE INVENTION

One aspect of the invention resides in an Audio Frequency (AF) recovery—DC restorer circuit after demodulation that filters received data without distorting, accurately and efficiently replicates digitally the transmitted data signal, and stabilizes the demodulated signal at a desired DC level which is critical for A/D conversion process or data acquisition to attain reliable bit duty cycles.

A demodulated baseband signal travels from a demodulated output terminal through a buffered low pass filter and then becomes coupled to an active peak clamper or DC restorer, which preferably includes a capacitor, an operational amplifier and a diode. The DC restorer removes all of the DC portion of the demodulated signal and replaces it with a fixed DC reference voltage. The demodulated signal, which is now ideally clamped at the fixed DC reference voltage that is stable, is then connected to a comparator or data slicer that converts the signal into an exact digital replica of the transmitted data.

BRIEF DESCRIPTION OF THE DRAWINGS

For a better understanding of the present invention, reference is made to the following description and accompanying drawings, while the scope of the invention is set forth in the appended claims.

FIG. 1 shows a signal flow block diagram showing signal outputs and waveform characteristics in accordance with the invention.

FIG. 2 shows a schematic diagram of one embodiment of a topology of an AF Recovery-DC circuit in accordance with the invention.

DESCRIPTION OF THE PREFERRED EMBODIMENT

Figure 3:
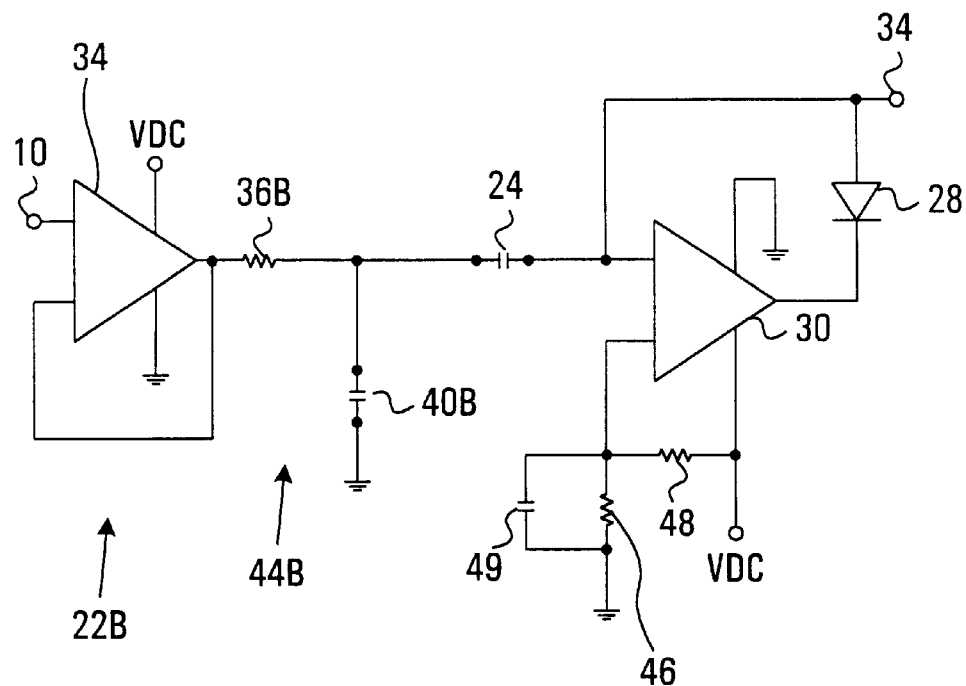
FIGS. 3 and 4 show schematic diagrams of further embodiments of filter topologies that may be incorporated with an active clamper to form the AF recovery-DC restorer circuit of the present invention.

Turning to FIG. 1, a signal flow block diagram is shown, depicting the demodulator output terminal 10, AF Recovery-DC Restorer circuit 12, and comparator or data slicer 14, all in box form. The waveform characteristic 16 of the demodulator output at the terminal 10 is shown, as well as the waveform characteristic 18 from the AF Recovery-DC Restorer circuit 12 and the corresponding replicated data 20. The AF Recovery-DC Restorer circuit 12 includes an active low pass filter 22, a capacitor 24 and an active damper 26. The active damper 26 includes a diode 28, an operational amplifier 30 and a new Vref source 32.

Turning to FIG. 2, the active low pass filter 22A may include an operational amplifier 34 that attenuates high frequency noise affecting the quality of the demodulated baseband signal. This is to ensure better sensitivity and to avoid false triggering due to high frequency noise. Inputs to the active low pass filter 22A include a feedback signal and the demodulated baseband signal from the demodulated output terminal 10.

In addition, the active filter 22A may also include resistors 36A, 38A and capacitors 40A, 42A forming an n-pole filter 44A with a certain gain depending upon the application intended by the designer. In the preferred embodiment of FIG. 2, a 2 pole active low pass filter with a unity gain configuration is shown. The operational amplifier 34 of the active low pass filter 22A has an output in electrical connection with capacitor 24 and whose inputs include a feedback signal and an audio frequency baseband signal that is unfiltered and demodulated, received from a demodulator output terminal, and whose output transmits the same signal to the capacitor 24.

Figure 4:
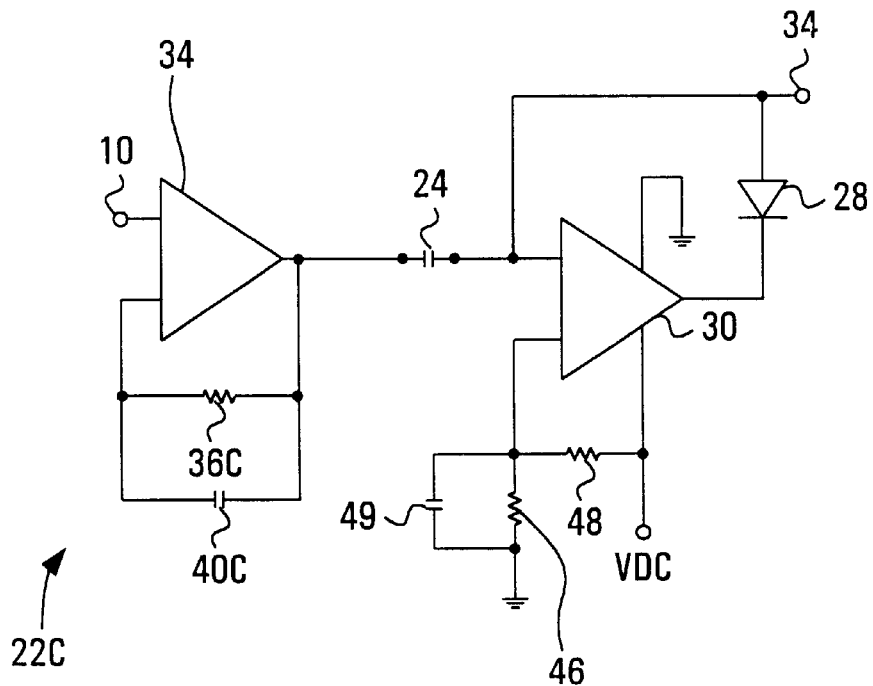

In lieu of the active low pass filter 22A, the coupling may be to other types of filter configurations or topologies such as those illustrated in FIGS. 3 and 4. FIG. 4 depicts a topology with an active filter 22C having the same filtering functions as that of the filter 22A of FIG. 2. Although FIG. 3 also depicts a topology with the same filtering function as that of FIG. 2, the difference is that FIG. 3 shows a buffer 22B with an operational amplifier 34A being separated from the filter 44B, which is a passive low pass filter (LPF). In reference to FIG. 3, the operational amplifier 34 has an output in electrical connection with the passive LPF 44B, which is a combination of a resistor 36B and capacitor 40B. The inputs to the operational amplifier 34 include a feedback signal and an audio frequency baseband signal that is unfiltered and demodulated from a demodulator output terminal. The passive filter 44B receives and filters the audio frequency baseband signal from the buffer 22B of an operational amplifier 40, and transmits the same to the capacitor 24. Again these are just examples of numerous possible configurations of filters that may be attached to an active clamper to form the AF Recovery-DC restorer circuit. Such filters will attenuate and filter high frequency noise that may affect the quality of the demodulated baseband signal.

Referring again to FIG. 2, the demodulated baseband signal leaves the active low pass filter 22A and is then coupled to the active clamper 26A via capacitor 24. The active clamper 26A clamps the filtered baseband signal above or below a level depending upon the orientation of the diode 28. This level is now the new desired Vref (new Vref). In the case of FIG. 2, because of the diode 28 orientation as shown, the diode 28 clamps the baseband signal below the new Vref voltage. This clamped baseband signal is the same in amplitude and waveform as the filtered baseband signal, except that the Vavg of the filtered signal is now at a new level due to the new Vref. This new Vref is independent of DC variations at the AF recovery-DC restorer circuit input but may be adjusted to a desired value by varying the impedance values of resistors 46, 48. A noise filter capacitor 49 is provided as a precaution against high frequency noise in view of the power supply VDC.

An operational amplifier 30 has a new Vref as an input and the filtered, demodulated baseband signal as another input. The operational amplifier performs the clamping function, generating as output the clamped baseband signal whose Vavg is at the new level. The New Vref value will be obtained if the decision level of a given comparator or data slicer 14 (FIG. 1) is known. Given a constant Vpp at the output of the clamper 26A, the new Vref may be determined when the new Vavg of the demodulated signal is made equal to the decision level of the comparator or data slicer 14. The clamped baseband signal is then transmitted to the comparator or data slicer 14 through terminal 34.

The comparator or data slicer 14 uses the clamped baseband signal to replicate the transmitted digital data 20 (FIG. 1). The new Vavg serves as a decision point for the comparator in converting an analog baseband to a digital form. The new Vref, therefore, at the non-inverting input of the operational amplifier 34 (FIG. 2) that is determined by resistors 46, 48, must be set in order that the new Vavg value will be the same value as the decision level of a given comparator or data slicer 14. This is important because the decision level value of the comparator or the data slicer 14 is the point where the output toggles or changes state as the demodulated signal crosses this level, thus reproducing the transmitted data in digital form 20.

Figure 5:
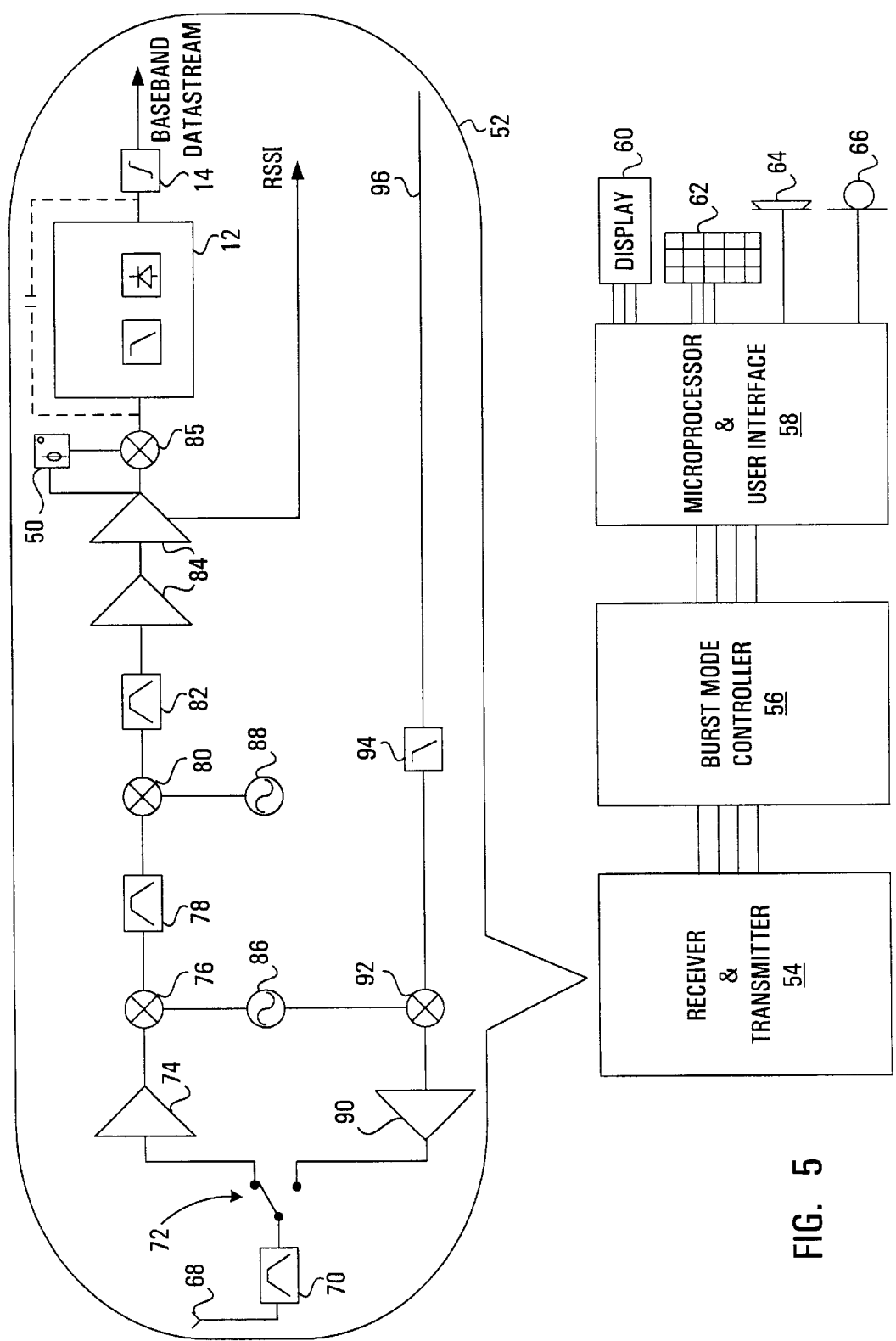
FIG. 5 shows a cordless phone block diagram of the AF recovery—DC restorer circuit of the present invention being applied as replacement for a conventional AC coupling capacitor in the receiver and transmitter section of the cordless phone.

The circuit of FIG. 2 may be incorporated into the backend of a receiver's demodulation stage for a narrowband cordless phone such as the Northern telecom NORSTAR M7410 (Quest) as shown in FIG. 5. By employing a 900 MHz digital narrowband cordless NORSTAR terminal, cordless phone performance, as concerns voice quality, sensitivity and synchronization, improves over that of existing 49 MHz digital band.

From a discriminator 50 (see FIG. 5), an unfiltered demodulated signal at a certain Vavg comes out from the terminal of the Demodulator output terminal 10 (see FIG. 1). The signal's Vpp should be fairly constant to have a fixed New Vavg value. This is important as the New Vavg value will be the same value as the toggle point of the comparator or the data slicer connected at the output of the AF recovery—DC restorer circuit. Also a constant and fairly large Vpp would ensure that false triggering would not happen.

The audio frequency-DC restorer circuit of the present invention is preferably utilized after the demodulation stage of a phase shift keyed (PSK), frequency shift keyed (FSK) or frequency modulated (FM) signal, thereby replacing conventional DC content with a controlled DC level. Implementation of the audio frequency-DC restorer circuit results in accurate replication of the transmitted data at the baseband back-end of the receiver system. This improves and increases the base-handset synchronization and data acquisition capability and provides better sensitivity.

FIG. 5 shows the radio block diagram 52 of a receiver and transmitter section 54 of a narrowband cordless phone, which also has a burst mode controller section 56 and a microprocessor and user interface 58, display 60, keypad 62, handset earpiece 64 and handset mic 66. The diagram 52 shows the discriminator 50 and an antenna 68, band pass filter 70, time division duplex (TDD) switch 72, low noise amplifier 74, 1st mixer 76, 1st IF filter 78, 2nd mixer 80, 2nd IF Filter 82, limiting amplifiers 84, 3rd mixer 85, 1st local oscillator (LO) 86, 2nd local oscillator (LO) 88, power amplifier 90, upconverting mixer 92, active LPF 94 to which is received TX data modulation 95, the AF Recovery-DC Restorer circuit 12 of the invention to data slicer 14.

Operation is as follows. From the antenna 68, the RF signal passes through the Band Pass Filter 70. The Band Pass filter ensures that the desired signal only goes through the TDD switch 72 and the rest are significantly attenuated. The TDD switch 72 moves from TX to RX at an instant fast rate to ensure full duplex communication.

During RX, the TDD switch is connected to the Low Noise Amplifier (LNA) 74. The LNA 74 amplifies the received signal to a significant level so that it could be effectively mixed down to the 1st Intermediate Frequency (IF). The mixing process is done at the mixer 76 in which the desired RF signal is beat up with a Local Oscillator (LO) 86 to produce the IF frequency.

This 1st IF goes through the 1st IF filter 78 to ensure that all other frequencies and interferences are attenuated except the 1st IF 78. This 1st IF 78 goes through the second mixer 80 to be mixed down by the 2nd LO 88 to produce a much lower 2nd IF. The 2nd IF frequency then passes through the bandpass filter 82 to ensure that no other frequencies, noise, or interferences go along with it to the next stage. This signal goes to the Limiting Amplifiers 84 to amplify the IF level significantly to ensure that the output level is constant.

The baseband signal is then removed from this 2nd IF through the demodulator 85 with the use of the phase shift ceramic discriminator 50. This demodulated signal, which represents the transmitted information, is now passed through the AF Recovery-DC restorer circuit 12 that clamps the signal to a new DC voltage reference. The demodulated signal with its new Vref is then coupled to a data slicer 14 which squares up the analog signal. The data slicer 14 converts the analog signal to digital bits of information needed by the microprocessor for data processing.

During transmission, the TDD switch 72 is connected to the TX power amp 90. The TX data, having been modulated, goes through an active LPF 94 to ensure that the desired signal will only be amplified and be upconverted during transmission and not other frequencies or noise. The filtered signal goes through a mixer 92 for it to be upconverted to a desired RF band. This desired RF signal is then amplified by the Power amp 90 and transmitted through the band pass filter 70 and out to the antenna 68.

While the foregoing description and drawings represent the preferred embodiments of the present invention, it will be understood that various changes and modifications may be made without departing from the spirit and scope of the present invention.

What is claimed is:

1. An audio frequency recovery-DC restorer circuit, comprising:

an operational amplifier having two inputs and an output;

resistor circuitry arranged to supply a reference voltage signal Vref to said operational amplifier;

a diode electrically connected to said output; and a capacitor connected in series to one of said inputs of said operational amplifier, wherein said capacitor couples a demodulated audio frequency baseband signal to the operational amplifier, the demodulated audio frequency baseband signal being in a filtered condition free of high frequency noise that may otherwise affect quality and having an average voltage level Vavg at a level, said operational amplifier being configured and arranged to clamp the demodulated audio frequency baseband signal above or below the Vref depending upon an orientation of the diode so as to set a new desired Vref and provide as output a clamped baseband signal whose amplitude and waveform is identical to the demodulated audio frequency baseband signal before the clamping except for having a new average voltage (new Vavg) that is at a level different from that of the average voltage of the demodulated audio frequency baseband signal because of the new desired Vref.

2. A circuit as in claim 1, wherein said resistor circuitry includes at least two resistors, one of said two resistors being electrically connected between a ground and the one of said inputs and the other of said two resistors being electrically connected between a direct current voltage terminal and the one of said inputs, said Vref having a value dependent upon resistance values of said two resistors.

3. A circuit as in claim 1, in combination with a data slicer arranged to receive the clamped baseband signal from the output of the operational amplifier and adapted to replicate transmitted digital data, said data slicer including a comparator adapted to make a decision based on the new Vavg for converting an analog baseband to a digital form.

4. A circuit as in claim 1, in combination with a passive filter and a buffer, said buffer including an operational amplifier whose output is in electrical connection with said passive filter and whose inputs include a feedback signal and an audio frequency baseband signal that is unfiltered and demodulated from a demodulator output terminal, said passive filter receiving and filtering the audio frequency baseband signal from said buffer and transmitting same to said capacitor.

5. A circuit as in claim 1, in combination with an active filter that attenuates high frequency noise that may affect a quality of the audio frequency baseband signal and transmitting same to said capacitor.

6. An audio frequency recovery-DC restorer circuit, comprising:

means for filtering a demodulated baseband signal in a manner free of distortion and yet free of high frequency noise, the filtered and demodulated baseband signal having a reference voltage (Vref) level and an average voltage (Vavg) level; and means for clamping the filtered and demodulated baseband signal at a new reference voltage level different from a level of Vref to provide as output a clamped, filtered and demodulated baseband signal whose amplitude and waveform is identical to the filtered and demodulated baseband signal before clamping except for having a new average voltage at a level different from that of the Vavg because of the new reference voltage level.

7. A circuit as in claim 6, further comprising means for converting from analog to digital the clamped, filtered and demodulated baseband signal.

8. A circuit as in claim 6, further comprising means for acquiring data from the clamped, filtered and demodulated baseband signal.

9. A circuit as in claim 6, wherein said clamping means includes an operational amplifier, a capacitor and a diode, said operational amplifier being adapted to clamp the demodulated baseband signal above or below the Vref level depending upon an orientation of the diode.

10. A circuit as in claim 6, wherein said filtering means includes any one of a passive filter and an active filter that filters attenuated high frequency noise.

11. A circuit as in claim 6 in combination with data slicer circuit that is arranged to receive the clamped demodulated baseband signal centered at a level of the fixed direct current reference voltage to replicate digital data from the same.

12. A method of frequency recovery-DC restoring, comprising:

filtering a demodulated baseband signal in a manner free of distortion and yet free of high frequency noise, the filtered and demodulated signal having a reference voltage level (Vref) and an average voltage (Vavg); and clamping the filtered and demodulated baseband signal at a new reference voltage level that is different from a level of the Vref to provide as output a clamped, filtered and demodulated baseband signal whose amplitude and waveform is identical to the filtered and demodulated baseband signal before clamping except for having a new average voltage at a level different from that of Vavg because of the new reference voltage level.

13. A method as in claim 12, further comprising converting from analog to digital the clamped, filtered and demodulated baseband signal.

14. A method as in claim 12, further comprising acquiring data from the clamped, filtered and demodulated baseband signal.

15. A method as in claim 12, wherein the step of clamping includes clamping with an operational amplifier above or below the Vref depending upon an orientation of a diode.

16. A circuit as in claim 1, wherein the new desired voltage reference signal Vref is independent of direct current variations at the inputs to the operational amplifier.

17. A circuit as in claim 1, wherein variations in an impedance level of the resistor circuitry adjusts the new desired reference voltage signal Vref.

18. An audio frequency recovery-DC restorer circuit, comprising:

a filter configured to filter a demodulated baseband signal in a manner free of distortion and yet free of high frequency noise, the filtered and demodulated baseband signal having a reference voltage (Vref) level and an average voltage (Vavg) level; and a clamp configured to clamp the filtered and demodulated baseband signal at a new reference voltage level different from a level of Vref to provide as output a clamped, filtered and demodulated baseband signal whose amplitude and waveform is identical to the filtered and demodulated baseband signal before clamping except for having a new average voltage at a level different from that of the Vavg because of the new reference voltage level.

19. A circuit as in claim 18, further comprising a converter configured and arranged to convert from analog to digital the clamped, filtered and demodulated baseband signal.

20. A circuit as in claim 18, further comprising an acquirer configured and arranged to acquire data from the clamped, filtered and demodulated baseband signal.

21. A circuit as in claim 18, wherein said clamp includes an operational amplifier, a capacitor and a diode, said operational amplifier being adapted to clamp the demodulated baseband signal above or below the Vref level depending upon an orientation of the diode.

22. A circuit as in claim 18, wherein the filter is an active filter that attenuates and filters high frequency noise.

23. A circuit as in claim 18, wherein the filter is a passive filter that attenuates and filters high frequency noise.

* * * * *